UNITED STATES PATENT OFFICE.

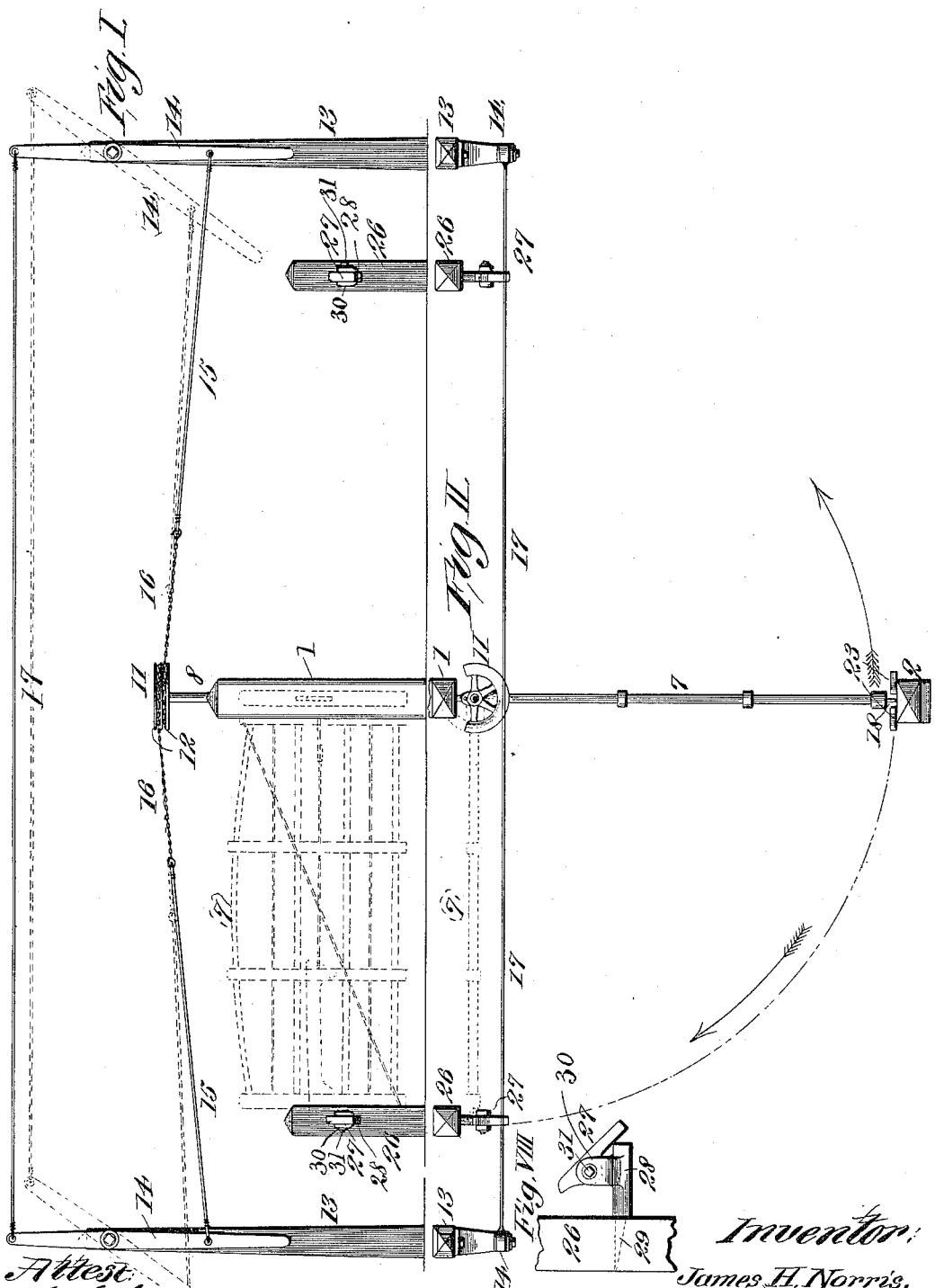

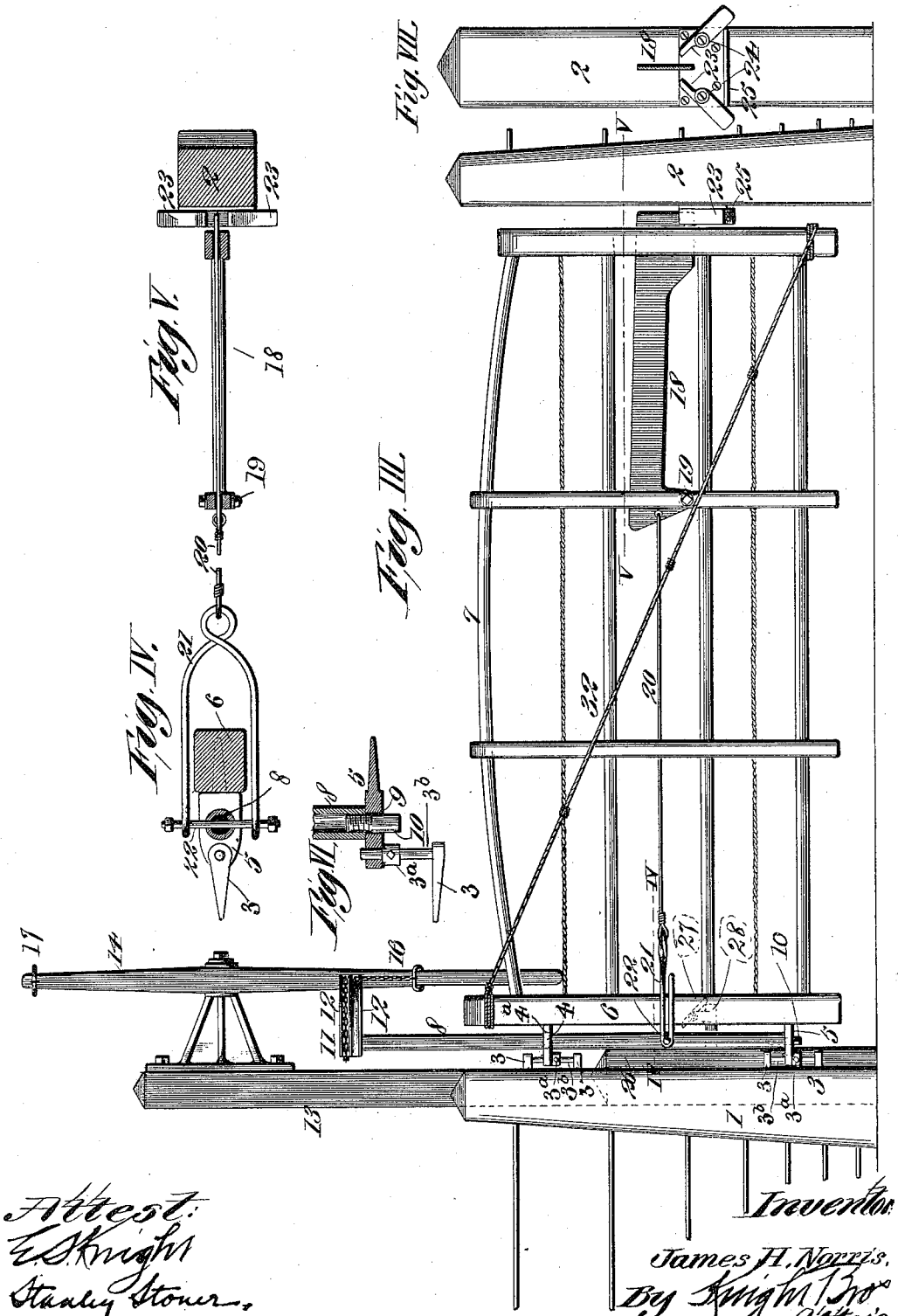

JAMES H. NORRIS, OF VIRGINIA, ILLINOIS.

FARM-GATE.

SPECIFICATION forming part of Letters Patent No. 566,216, dated August 18, 1896.

Application filed February 24, 1896. Serial No. 580,474. (No model.)

*To all whom it may concern:*

Be it known that I, JAMES H. NORRIS, a citizen of the United States, and a resident of Virginia, in the county of Cass and State of Illinois, have invented a certain new and useful Improvement in Hand-Opening Swinging Gates, of which the following is a full, clear, and exact description, reference being had to the accompanying drawings, forming a part of this specification.

My invention relates to that class of hand-opening swinging gates operated at a distance from the gate by means of pivoted levers and connections leading from the levers to the gate. The gate is arranged to be swung in either direction from either direction of approach. Hence it is always possible to open it in the opposite direction from the side approached.

My invention consists in features of novelty hereinafter fully described, and pointed out in the claims.

Figure I is a side elevation of my improved hand-opening swinging gate. Fig. II is a top view thereof. Fig. III is a side elevation of a gate and one side of the operating mechanism. Fig. IV is a detail top view of the latch-operating device, the rear upright of the gate and the tubular segment-carrying bar being shown in horizontal section taken on line IV IV, Fig. III. Fig. V is a detail view illustrating the gate-latch and keepers, a section being taken through the forward uprights of the gate and through the outer gate-post. Fig. VI is a detail view, part in section, of the lower gate-hinge and the lower end of the tubular segment-carrying bar. Fig. VII is a face elevation of the outer gate-post. Fig. VIII is an enlarged detail view of the keeper employed to receive the gate-latch when the gate is open.

In the drawings, 1 designates the inner gate-post, and 2 the outer gate-post.

3 designates the two staples that receive the hinge-pins 3$^b$, which carry the eyepieces 4 and 5, whose shanks are inserted in the rear upright 6 of the gate 7.

3$^a$ are set-screw-containing collars secured adjustably to the hinge-pins and on which the eyepieces rest, and through means of which the elevation of the gate may be varied. The eyepiece 4 is provided with a vertical opening 4$^a$, through which the tubular upright 8 is inserted, and the eyepiece 5 is provided with an opening 9, which receives a pin 10, secured in the lower end of the tubular upright 8. The opening 9 is of smaller diameter than the upright 8. Hence the upright is not permitted to enter said opening, but its lower end forms a shoulder around the pin 10, and through this means the upright is supported on the lower gate-hinge, consisting of the hinge-pin 3$^b$, staples 3, and eyepiece 5. Rigidly mounted on the upper end of the upright 8 is the segment 11, provided with two horizontal grooves 12.

13 designates posts located at opposite sides of the gate at a distance therefrom, and pivotally mounted on each post is a rocking lever 14, swinging in a vertical plane. Below the pivot of each lever is secured a wire 15, and to the opposite ends of each wire is secured a chain 16, each of which chains passes from its wire 15 around the face of the segment 11 in one of the grooves 12 to the opposite extremity of the segment from the side from which it approaches, and its end is secured to the segment at said extremity. Each chain operates in its individual one of the two grooves 12.

17 designates a wire connected at one end to the upper end of one of the levers 14 and at its other end to the upper end of the other lever 14, through means of which wire 17 the movement imparted to the lever at either side is transmitted to the lever at the opposite side of the gate.

18 designates the gravitating gate-latch, pivoted at 19 to one of the intermediate uprights of the gate. Connected to the rear end of the latch is one end of the wire 20, the other end of which is secured to a fork 21, the ends of said fork having loose connection with a cross-pin 22, which passes through the upright 8 and is rigid therewith. Attached to the outer post 2 are the keepers 23. These keepers are hung on pins 24 and are provided with a stop-plate 25, and since they are pivoted at one side of their center of gravity their outer and heavier end always bears against said plate, unless raised therefrom in the manner hereinafter described. When the gate is closed, the latch 18 hangs between said keepers, as shown in Fig. VII.

26 are two posts approximately in line with posts 1 and 13 and removed from post 1 a distance equal to the length of the gate 7. They are provided with keepers 27, which are placed at points coincident with and adapted to secure the latch 18. These keepers I prefer to construct with a pin 28, having a pointed end or shank 29, which is adapted to be driven into the posts 26. The upper side of the pin 28 carries a fork 30, in which the keeper 27 is pivoted at 31. The outer end of this keeper is heavier than the inner and bears against the end of the pin 28.

32 is a stay-wire to prevent the gate from sagging.

The device is operated as follows: A person approaching from either direction, say the right, Fig. I, grasps the lever-arm 14 and either pushes it from him or draws it toward him, according to the direction in which he desires the gate to open. Assuming that he wishes the gate to open from him, he pushes the lever to the position shown in dotted lines in Fig. I. This movement throws the upper end of the lever toward him, and with it the wire 17. This in turn throws the opposite lever 14 to the position shown in dotted lines, which movement causes the chain on the opposite side of the gate to pull upon the segment 11. This segment 11, upright 8, and pin 22 all being rigid, the turning thereof, as indicated, draws the wire 20, which is connected with latch 18 above its pivotal point 19. The outer end of said latch is thus raised above the end of its keeper 23, and the continued movement of the segment 11 opens the gate to the position shown in dotted lines in Figs. I and II. As the gate thus opens toward the post 26 the latch 18 rides over the keeper 27, said keeper being pivoted, as described, until it strikes the post. The keeper then drops to its normal position, as shown in Fig. VIII, the latch being between it and the post, and the gate is thus secured in an open position.

After having driven through the open gateway, the lever 14, opposite to the one used in opening the gate, is pushed to the right. Through wire 17 and the opposite lever 14 a pull is exerted on the right-hand chain 16, and the segment 11 is turned in the direction opposite to that used in opening the same. The motion is communicated again, as described, to the latch-wire 20, the latch 18 is raised above its keeper 27, and the gate swung to its original closed position. As it closes, the latch rides over the keeper 23 and the gate is secured.

By reversing the movement described to the lever 14 the gate can be swung open toward a person instead of away from one. No matter in which direction it is opened, the motion imparted first unfastens the latch from its keeper and then swings the gate into the desired position and secures the same in such position. Any one is thus enabled to open the gate in either direction and then close the same by simply swinging the lever 14, and the securing of the gate in either the open or closed position is automatically accomplished.

I claim as my invention—

1. A hand-opening swinging gate comprising an inner gate-post, upper and lower staples connected by hinge-pins, the set-screw collars adjustable on the hinge-pins, the gate having eyepieces secured to the inner upright thereof and supporting the gate on the collars, the outer gate-post, having keepers, the latch pivoted at its inner end to the gate the intermediate upright supported in the eyepieces of the hinges, the cross-pin extending through the intermediate upright, means for connecting the latch to the ends of the cross-pin, and means for rotating the intermediate upright, for lifting the latch, and for swinging the gate, substantially as described.

2. A hand-opening swinging gate comprising an inner gate-post, the gate, hinges by which the gate is supported on the inner gate-post, the outer gate-post having keepers, the latch pivoted at its inner end to the gate, the intermediate upright supported on the hinges, the cross-pin extending through the intermediate upright, the wire connected to the latch, the fork connected to the wire and to the ends of the cross-pin and means for rotating the intermediate upright for lifting the latch and for swinging the gate; substantially as described.

3. A hand-opening swinging gate comprising an inner gate-post, a gate hinged to said post, an intermediate upright supported on the gate-hinges, a cross-pin extending through the post, the latch pivoted to the gate, the wire connected to the latch, the fork connected to the wire and to the ends of the cross-pin, the segment having upper and lower grooves and secured to the intermediate upright, the lever-posts, the levers pivoted to the lever-posts and swinging in a vertical plane, the wire connecting the upper arms of the levers, and the chains extending from the opposite corners of the segment located in their respective grooves, and connected to the lower ends of the levers; substantially as described.

JAMES H. NORRIS.

In presence of—
J. F. ROBINSON,
S. P. HENDERSON.